(No Model.)
J. LINDERS.
COFFEE POT STAND.
No. 333,315. Patented Dec. 29, 1885.
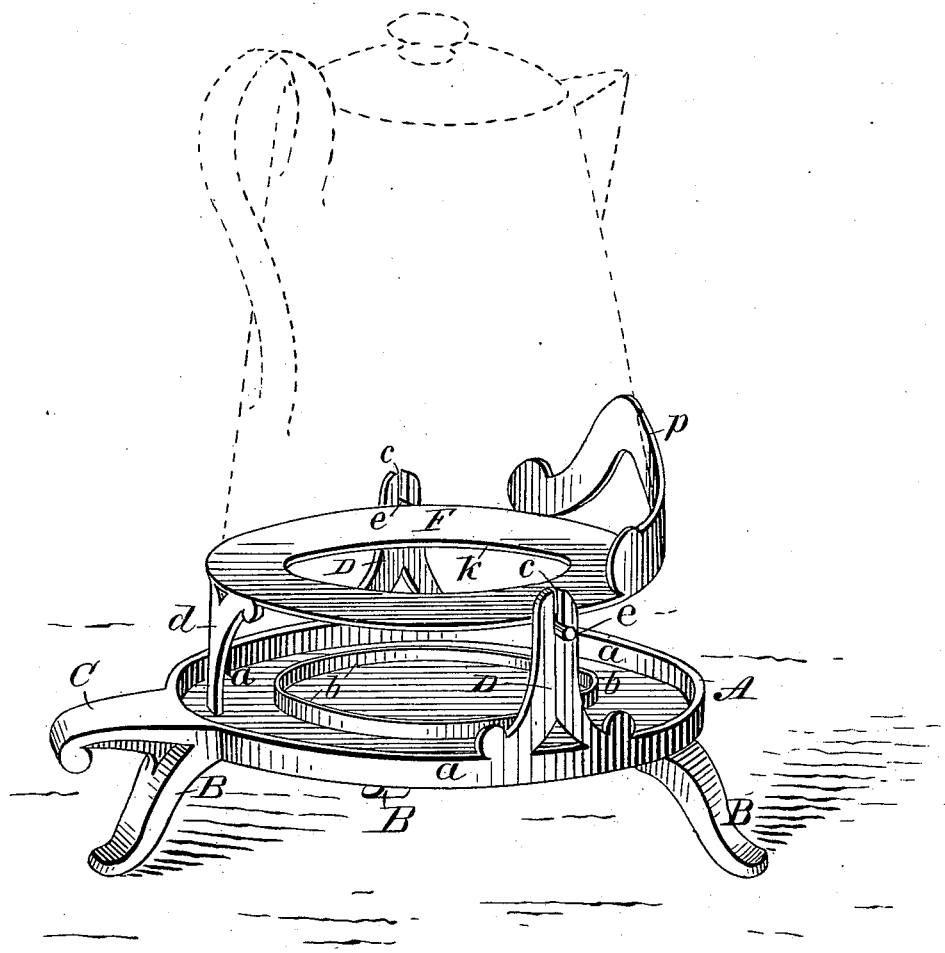
WITNESSES:
J. D. Garfield
C. Sedgwick
INVENTOR:
J. Linders
BY Munn & Co
ATTORNEYS.

UNITED STATES PATENT OFFICE.

JOSEPH LINDERS, OF WINFIELD, WEST VIRGINIA.

COFFEE-POT STAND.

SPECIFICATION forming part of Letters Patent No. 333,315, dated December 29, 1885.

Application filed September 8, 1885. Serial No. 176,496. (No model.)

*To all whom it may concern:*

Be it known that I, JOSEPH LINDERS, of Winfield, in the county of Putnam and State of West Virginia, have invented a new and Improved Coffee-Pot Stand, of which the following is a full, clear, and exact description.

My invention relates to the construction of a coffee-pot stand, its object being to produce a stand which will support the coffee-pot above a drip pan or trough, the pot being placed upon a tilting frame to avoid the trouble and inconvenience of lifting the pot when the coffee is being poured.

Reference is to be had to the accompanying drawing, forming part of this specification, which is a perspective view of my improved coffee-pot stand, the pot being shown in dotted lines to illustrate its position upon the stand.

The stand illustrated in the drawing consists of a pan, A, supported by legs B B, and preferably provided with a handle, C, although such handle is not at all essential to the working of my invention. The pan A is surrounded by a rim, $a$, and in its center has a compartment formed by the ridge $b$, which is preferably concentric with the rim $a$. Two standards, D D, project upward from the outer edge of the pan A just forward of the center line, said standards being slotted at $c$ $c$, as is clearly shown. A disk or rim, F, the diameter of which is slightly less than that of the pan A, is arranged to rest above said pan, being supported by a leg, $d$, at the rear and by the journals $e$ $e$, which enter and ride in the slots $c$ $c$ of the standards D D. The forward edge of the disk F is provided with an upwardly-projecting flange, $p$, which serves to support the coffee-pot when the disk is tilted to pour out the coffee. The disk F is formed with a central opening, so that the bottom of the coffee-pot may be exposed to the full section of the flame of a small lamp which is placed on the pan A within the central ridge, $b$.

I am aware that a platform for supporting a coffee or tea pot has been hinged to a standard projecting from a base, and I am also aware that an annular seat for a pitcher has been hinged to an elevated segmental support, and I therefore do not claim such inventions.

Having thus described my invention, I claim as new and desire to secure by Letters Patent—

In a coffee-pot stand, the combination, with the pan A, formed with the rim $a$, ridge $b$, and legs B B, and provided with the standards D D, slotted at $c$ $c$, of a disk, F, formed with the leg $d$, journals $e$ $e$, opening, and flange $p$, substantially as described.

JOSEPH LINDERS.

Witnesses:
 HARRY WINTERS,
 J. B. REYNOLDS.